United States Patent [19]

McOnie et al.

[11] Patent Number: 5,562,832
[45] Date of Patent: Oct. 8, 1996

[54] ABSORPTIVE SLUDGE DEWATERING PROCESS FOR PAPERMAKING WASTE

[75] Inventors: Robert W. McOnie, Kenner, La.; John E. Rude, Lake Oswego, Oreg.

[73] Assignee: Beloit Technologies, Inc., Wilmington, Del.

[21] Appl. No.: 372,537

[22] Filed: Jan. 13, 1995

[51] Int. Cl.[6] .................. C02F 1/52; C02F 11/14
[52] U.S. Cl. .................. 210/710; 162/189; 210/609; 210/721; 210/769; 210/771; 210/778; 210/928; 210/205
[58] Field of Search .................. 162/189, 190, 162/191; 210/609, 631, 710, 721, 768, 769, 770, 771, 778, 928, 205

[56] References Cited

U.S. PATENT DOCUMENTS

| | | | |
|---|---|---|---|
| 4,235,174 | 11/1980 | Spurrell | 110/346 |
| 4,260,488 | 4/1981 | Condolios | 210/259 |
| 4,380,496 | 4/1983 | Maffet | 210/609 |
| 4,582,568 | 4/1986 | Iyengar | 162/258 |
| 4,828,577 | 5/1989 | Markham et al. | 44/589 |
| 4,983,258 | 1/1991 | Maxham | 162/189 |
| 5,207,009 | 5/1993 | Thompson et al. | 34/135 |
| 5,227,073 | 7/1993 | Bastgen et al. | 210/710 |
| 5,244,583 | 9/1993 | Goron et al. | 210/783 |
| 5,382,368 | 1/1995 | Sato | 210/768 |
| 5,392,721 | 2/1995 | Judd | 110/346 |

FOREIGN PATENT DOCUMENTS 60-25595  2/1985  Japan ................... 210/609

OTHER PUBLICATIONS

"Chemical and Physical Variables in Polymer–Induced Flocculation", vol. 10, May 1993, pp. 81–85, Minerals and Metallurgical Processing.
"Benefication of Phosphate: Theory and Practice", SME 1993, pp. 429–446.

Primary Examiner—Peter A. Hruskoci
Attorney, Agent, or Firm—Dirk J. Veneman; Raymond W. Campbell

[57] ABSTRACT

Secondary sludge produced in the papermaking process is dewatered by adding a material capable of absorbing water together with dry fibers to the secondary sludge, and mixing the secondary sludge with the dried fibers to produce a modified secondary sludge which has sufficient structure and low enough moisture that it may be further dewatered by mechanical means. The preferred fiber adding materials are those readily produced in the papermaking process, particularly dry primary sludge, dried fines and bark and fly ash from boilers.

4 Claims, 2 Drawing Sheets

ABSORPTIVE SLUDGE DEWATERING PROCESS FOR PAPERMAKING WASTE

FIELD OF THE INVENTION

The present invention relates to the treatment of sludges in general and to the treatment of sludges produced in papermaking in particular.

BACKGROUND OF THE INVENTION

A heightened awareness of the environmental side effects of manufacturing has led industry to make some remarkable strides in reducing the amount of industrial waste produced as a by-product of the production of items of manufacture. Historically the manufacture of paper has been thought of as energy intensive and requiring large amounts of water. Nonetheless, the paper industry has developed techniques for recycling the water used in the production of paper to the point that the demands papermaking makes on water resources have been substantially reduced.

At the same time that remarkable strides have been made in the papermaking industry's impact on water resources, paper itself has been found to be an economically recyclable material. Already a significant portion of the fiber used in manufacture of cardboard, certain grades of linerboard and newsprint are manufactured mainly or completely of recycled paper fibers. Unfortunately, paper cannot be recycled indefinitely. Each time the paper fibers are recycled, and even when the fibers are first manufactured from wood chips, a certain percentage of the fibers are broken into such small pieces that they cannot be used to form paper. These small particles of wood fibers must be separated from the wastewater stream to allow the wastewater to be reused. The separated product is known as sludge.

Sludge is divided into primary sludge and secondary sludge. Primary sludge, which typically is seventy percent of the sludge produced, consists of the larger particles of wood fibers. These particles may be separated from the wastewater stream by allowing the wastewater to stand in a clarifier where the heavy waste particles separate by settlement. Secondary sludge is comprised of those particles which are too small to settle in any reasonable length of time from the wastewater stream.

Recycling paper increases the amount of both primary and secondary sludge produced in the papermaking process. As the paper fibers are reused the percentage which are broken into pieces too small for use in manufacturing new paper increases. Secondary sludge consists of colloidal and colloidal-sized particles. The secondary sludge may be precipitated in a clarifier by use of a flocculent to precipitate the secondary sludge particles by the process of coagulation, that is, by binding together the minute particles to form flocs which are of sufficient size to precipitate in a clarifier.

Primary sludges are readily dewatered by mechanical means such as by screw press, see for example U.S. Pat. No. 4,582,568 to Iyengar, or by belt presses. Dewatered primary sludges may be dried in a rotary drum dryer, for instance, as shown in U.S. Pat. 5,207,009 to Thompson, et al. The dried primary sludge can then be used as a boiler feed to produce energy for use in the papermaking process.

Secondary sludge, however, has the consistency of gelatin and mechanical dewatering means are largely ineffective. Limited dewatering of secondary sludge has been achieved by blending the secondary sludge with the primary sludge, thus adding fibrous material which is contained in the primary sludge to the secondary sludge. The fibrous material provides limited bonding between the flocculated particles and the fibrous material which facilitates, to a limited extent, the dewatering by mechanical means of the combined sludges. Similarly, but perhaps with more success, pulped waste newsprint fibers have been mixed with phosphatic clays for dewatering them as suggested by R. F. McFarlin, et al. in *Benefication of Phosphate: Theory and Practice*, pp. 429–446 (SME, 1993).

Without effective dewatering of the secondary sludge, disposal of the secondary sludge presents a problem, a problem of increasing urgency as the use of recycled fiber increases. Drying the secondary sludge with a higher water content is energy-intensive and expensive. Landfilling the sludge is similarly undesirable from an expense and environmental viewpoint.

What is needed is a method of dewatering secondary sludge produced in the papermaking process.

SUMMARY OF THE INVENTION

The method of this invention provides dewatering capabilities of secondary sludge by the addition to the secondary sludge of dry fibrous and dry particulate materials capable of absorbing excess free water and flocculated sludge, and mixing the dry fibrous and particulate material with the secondary sludge which has sufficient structure to bind the secondary sludge and absorbed water such that it can be further dewatered by mechanical means.

The method of this invention dewaters secondary sludge produced in the papermaking process by adding a material capable of absorbing water together with dry fibers to the secondary sludge, and mixing the secondary sludge with the and fibers to produce a modified secondary sludge which has sufficient structure and low enough moisture that it may be further dried by mechanical means. The preferred fiber additive materials are those readily produced in the papermaking process particularly dry primary sludge dry fines, and fly ash from boilers.

It is a feature of the present invention to provide a method for dewatering secondary sludges formed in the papermaking process.

It is another feature of the present invention to provide a method for recovering energy from secondary sludges produced in the papermaking process.

It is a further feature of the present invention to provide a method for recovering energy from secondary sludges produced in the papermaking process.

Further objects, features and advantages of the invention will be apparent from the following detailed description when taken in conjunction with the accompanying drawings.

DESCRIPTION OF THE PREFERRED EMBODIMENT

Figure 1:
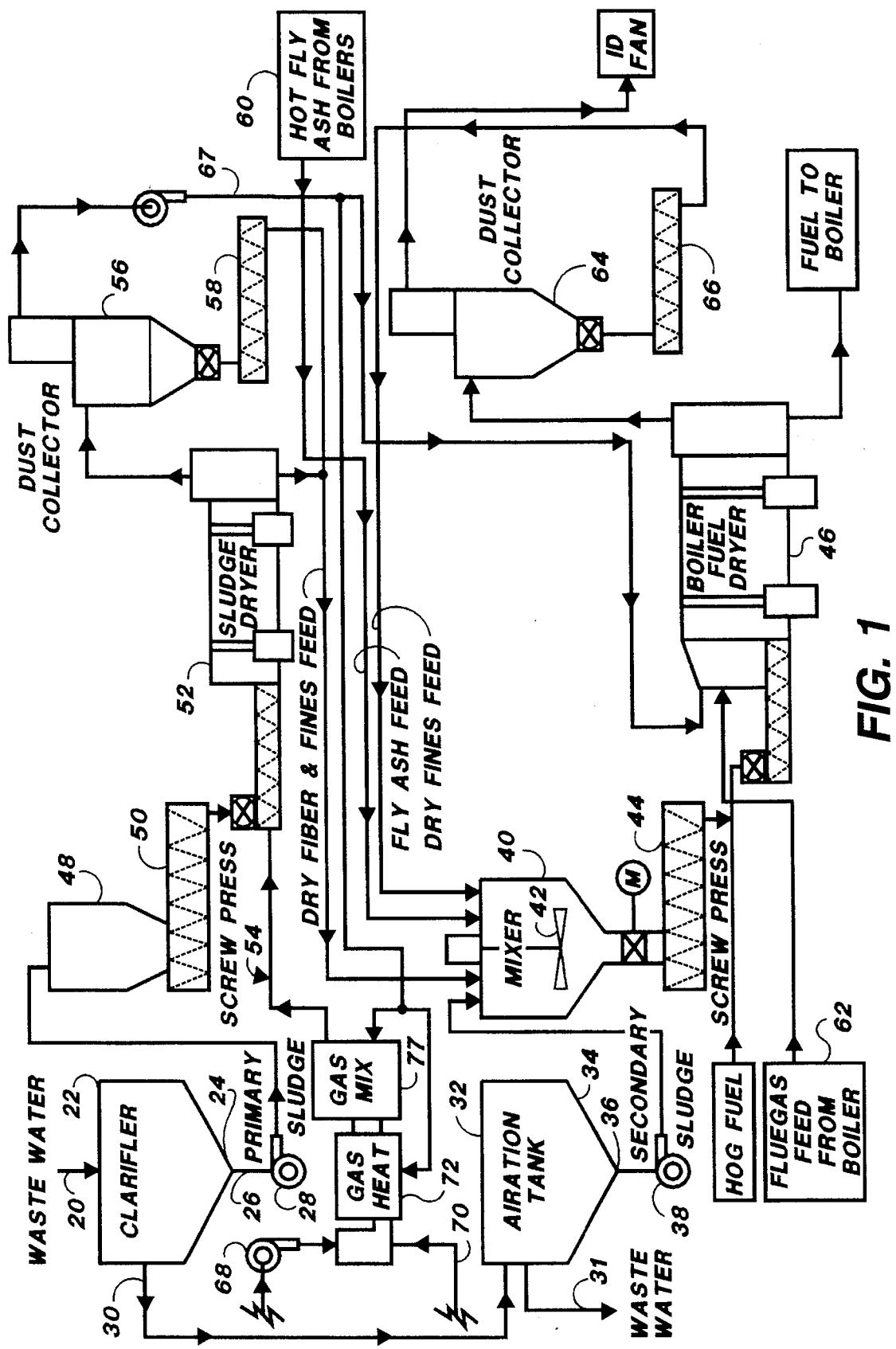
FIG. 1 is a schematic diagram of the process flow for dewatering and recycling secondary sludges.
Figure 2:
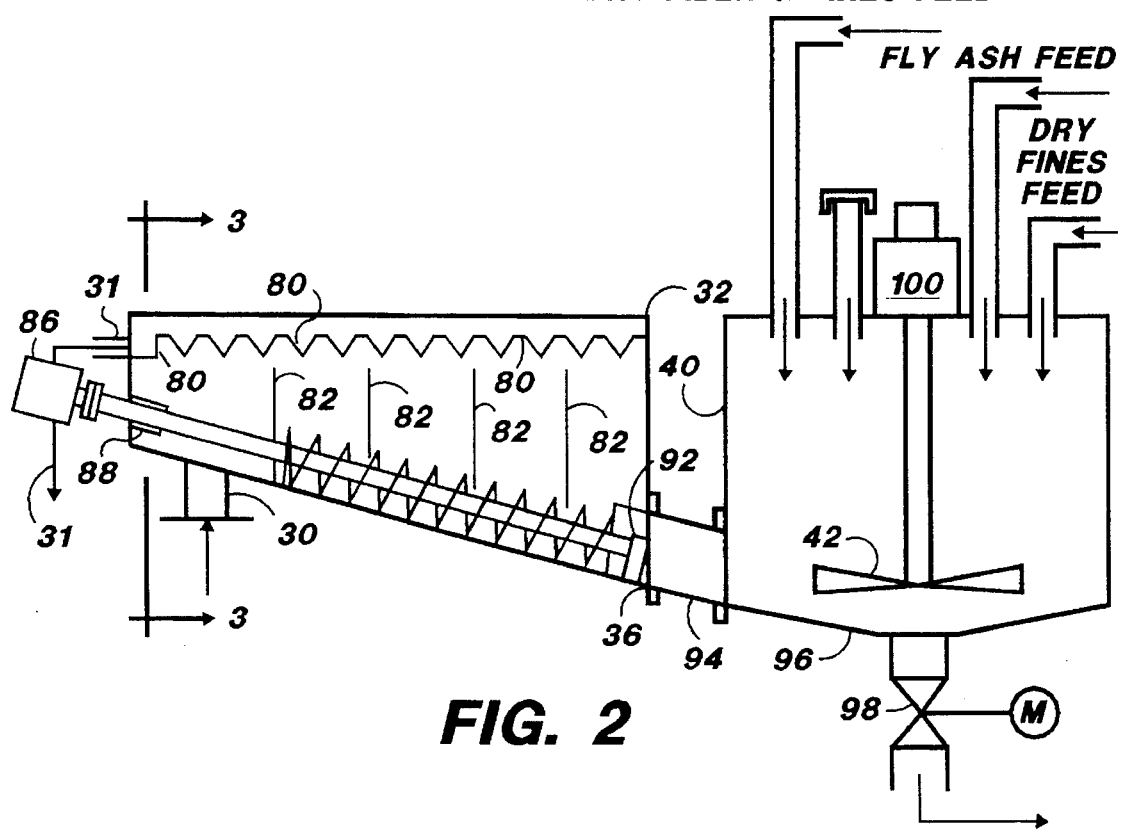
FIG. 2 is a somewhat schematic, cross-sectional view of a typical aeration tank and mixing tank as depicted in FIG. 1.
Figure 3:
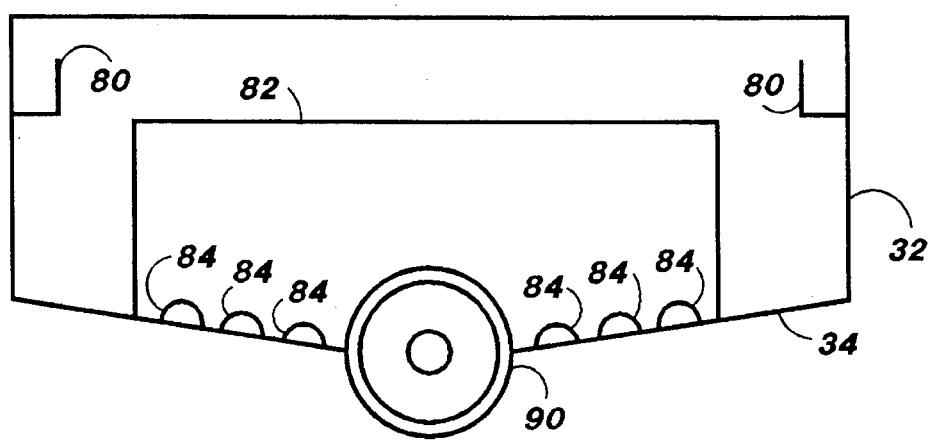
FIG. 3 is a cross-sectional view of the aeration tank of FIG. 2 taken along section lines 3—3.

Referring more particularly to FIGS. 1–3 wherein specific components used to practice the disclosed method are numbered; a process for removal of particulate wastes from a wastewater stream is disclosed. More particularly within the overall process for removing particulates from a wastewater stream, a method of dewatering secondary sludge is disclosed. The wastewater stream from a paper mill has two basic components: a dissolved component and a suspended component. The dissolved component, which is not dealt with here, contains various chemicals used in the delignification, bleaching, and other fiber treatment processes. Wastewater containing only dissolved chemicals may often be recycled for reuse or the chemicals recovered for reuse.

The suspended load must, however, be removed before reuse or disposal of the wastewater. The suspended load consists primarily of wood or plant fibers which cannot be used to make paper. Fiber fragments which are too small to be retained on the forming wire and fiber fragments which are too short to form a paper of reasonable strength are two examples of the components contained as the suspended load of paper plant wastewater. Other components of the suspended load include bark fines, wood fines and dirt. The suspended load in the wastewater divides into two components: primary sludge and secondary sludge.

As shown in FIG. 1, the wastewater stream 20 enters the primary clarifier 22, where primary sludge settles to the bottom 24 of the clarifier 22. Precipitation of the primary sludge is facilitated in the clarifier 22 by the low water velocities therein which allow particles to precipitate out of the wastewater. The bottom 24 of the clarifier 22 slopes downward to a drain 26 which allows the primary sludge to be removed by a pump 28.

A portion of the suspended load in the wastewater stream 20 is carried as particles too small to readily precipitate from the wastewater. These particles are colloidal in nature. The portion of the particulate load which will not readily settle constitutes secondary sludge and normally is approximately thirty percent of the entire suspended load in the wastewater. The supernate stream 30 carrying the secondary sludge is conveyed to an aeration tank 32. The aeration tank 32 performs two functions; first, aeration of the waste stream to reduce its BOD (Biological Oxygen Demand) by oxidizing the dissolved organics contained in the wastewater; and second, precipitation of the flocculated secondary sludge. Flocculent is added to the supernate stream 30. Flocculents generally are organic compounds that link together individual suspended particles into flocs which are then sufficiently large to separate from the wastewater by precipitation. The aeration tank 32, similar to the clarifier 22, has a sloped bottom 34 which feeds into a drain 36 which supplies a secondary sludge pump 38. The secondary sludge which leaves the aeration tank 32 by the drain 36 has an undesirable water content and a jelly-like consistency. A second supernate is drawn off the secondary sludge from the aeration tank 32 and is further processed to reclaim or dispose of the dissolved load contained in the clarified wastewater stream 31.

The steps described to this point are conventional and, in the past, secondary sludge gathered from the aeration tank has been disposed of by landfilling or discharging into a sewage treatment system.

While such disposal of secondary sludge waste is practiced, the cost of doing so may be high because of recent increases in the costs of dumping or sewage treatment.

However, despite the costs associated with the disposal of secondary sludge and the regulatory environment which discourages the disposal of industrial wastes, nevertheless not every process which can be demonstrated in the laboratory to utilize or recycle secondary sludge will be of practical value. A practical solution must utilize a minimum of added chemicals and must be able to handle large volumes on a continuous basis. The process disclosed in FIG. 1 accomplishes this objective.

In the treatment process of this invention, the secondary sludge is mixed with dry water-absorbing waste streams containing dry fibers, fine particulates and/or fly ash. The mixing takes place, as shown in FIG. 1, in a mixer 40 with a high efficiency agitator 42 which disperses the dry absorptive material throughout the secondary sludge. The effect of adding the dry fibrous and particulate material is to separate the water contained in the secondary sludge from the sludge particles. This may in practice, depending on the type of sludge and the type of dry materials added, be by drawing water out of the sludge or alternatively by drawing the sludge particles away from the Water. The net result is a sludge mixture which has sufficient structure that it is amenable to dewatering in a conventional screw press 44. The materials used to effect the dewatering and structural improvements in the secondary sludge will preferably be the dried primary sludge, dry absorptive particles such as bark fines and fly ash.

The dry fibrous and particulate material added to the secondary sludge absorbs excess free moisture and improves the structure of the secondary sludge by providing a fibrous and particulate mass to which the secondary sludge can bond, resulting in a secondary sludge having a much higher shear strength which allows the homogeneous mass to be mechanically dewatered. Fly ash is a particulate which also improves the secondary sludge structure. Fly ash also is a good absorber of water and draws water out of the secondary sludge.

The output of the screw press 44 has a water content of generally less than fifty percent, and is combined with raw bark wood waste and other extraneous materials generally known as hog fuel. The hog fuel normally requires drying for efficient use in the production of steam for use in the papermaking process. Thus, the hog fuel, together with the mixture containing secondary sludge, is fed into a conventional rotary dryer where the sludge mixture together with the hog fuel is dried to a level suitable for firing the boilers which produce steam. The process disclosed in FIG. 1 allows the dewatering of the secondary sludge which allows it to be economically dried.

Once dried, the sludge may be used as an economical fuel for powering the rest of the papermaking process. For the overall process to be economical the materials used for absorbing water and adding structure to the secondary sludge must themselves be waste products or by-products of the papermaking process.

The mixer 40 in FIG. 1 is shown being fed with three types of dewatering feeds: dry fiber, fly ash, and dry fines. The fiber is principally obtained by processing the primary sludge. The primary sludge is pumped by a pump 28 into a hopper 48 which feeds a screw press 50. The screw press 50 is similar to the screw press 44 employed to dewater the mixed sludges. The screw press employs an archimedes type screw which turns within a cylindrical screen. The end of the screen is closed by a spring loaded or pneumatically loaded plunger and the archimedes screw compresses the sludge against the closed end of the screen. This compression forces water from the sludge out through the cylindrical screen walls. When sufficient pressure has built up on the closed end, the spring or pneumatic closure moves aside to allow the material to exit the end of the screen.

Upon leaving the screen, the primary sludge is fed to a dryer 52. The dryer is heated by a stream of hot gasses 54 which enter the dryer along with the primary sludge. When the primary sludge is dried within the dryer 52, a majority of the dried sludge becomes airborne and passes to a cyclone 56 where it is separated from the gas stream and exits the cyclone through a draw off screw 58, which transfers it to a conveyance system which transports the dried primary sludge to the mixer where it joins the secondary sludge. Fly ash 60 from the boilers is also added to the mixer 40. Additionally, when the mixed sludges are added to the hog fuel in the dryer 46, a certain percentage leaves the dryer with the flue gases 62 which are used to heat the dryer. These fine particulates are collected in a second cyclone 64 where the particulates are separated from the gas system and exit the cyclone through a draw off screw 66, which transfers the material to a conveyance system to transport it to the mix tank 40.

It is desirable for the material feed loops in the process of dewatering secondary sludge to utilize recycled materials generated from the boilers and waste-recovery system. Similarly it is desirable that the use of energy be minimized by the reutilization of heated gas streams. Thus, the boiler fuel dryer 46 is fed from flue gases 62 which are the exhaust products of the boilers. Combustion air is passed through a fan 68 and is mixed with an incoming gas fuel stream 70, and is fired in a refractory lined combustion chamber 72. The diluent gas stream 67 from the cyclone 56 is mixed with the combusted gas stream within the combustion chamber 72, or the mixing chamber 77, or a combination of both. The hot combusted gas passes from the combustion chamber 72 through a mixing chamber 77, to the infeed portion of the sludge dryer 52. A portion of the diluent gas stream 67, may also be injected into the infeed of the boiler fuel dryer 46.

The reason for recirculating diluent gas from the cyclones is to control the oxygen content of the gas stream to the dryers 52, 46 to prevent combustion in the dryers. The gas exiting the dust collector 64 is fed to an induced draft (ID) fan where it is exhausted to a gas cleaning facility, such as a wet scrubber or electrostatic precipitator, before being exhausted to atmosphere.

Referring more particularly to FIGS. 2 and 3, a particular embodiment of the aeration tank 32 and mixer 40 is shown. The supernate stream 30 enters the bottom 36 of the aeration tank 32 which is rectangular. Around the upper periphery of the tank is located a decanting weir which decants the clarified waste water stream 31. To aid in settlement, the tank 32 has sludge baffles 82 which are mounted to the bottom 34 of the aeration tank 32. Where the sludge baffle 82 joins the aeration tank bottom 34, portions of the baffle 82 define sludge transfer holes 84 as shown in FIG. 3. The sludge baffles 82 and the transfer holes 84 aid in the settlement and movement of the sludge toward the sludge transfer screw 90.

The sludge transfer screw is driven by a drive assembly 86 which enters the tank 32 through a support bearing 88. The distal end of the transfer screw 90 is supported by a bearing 92 adjacent to the aeration tank drain 36. A sludge transfer pipe 94 communicates with the bottom 96 of the mixer 40. An efficiency agitator 42 driven by a motor 100 mixes the secondary sludge with the dry absorbent material as previously described. The mixed sludge leaves the mixer 40 through a motorized automatic flow control valve 98 where it enters a screw press 44 as shown in FIG. 1.

It should be understood that wherein the ratio between primary sludge and secondary sludge is given as seventy to thirty percent, depending on the process producing the wastewater 20, the ratio may be higher or lower. Particularly when reprocessing recycled paper, the percentage of secondary sludge may be higher.

It should also be understood that not all of the dried primary sludge need be added to the secondary sludge in order to produce a dewaterable mixture. The ability to dewater the secondary sludge depends on the amount of dry fiber and/or other dry particulates added to the secondary sludge, and the retention time within the mixer.

It should further be understood that wherein screw presses are shown and described, belt presses which utilize foraminous belts which contain the sludges and which are compressed to dry moisture through the belts could be employed.

As shown in FIG. 1, the boiler fuel dryer, will normally be larger than the sludge dryer 52. And it should also be understood that various configurations of rotary or nonrotary dryers could be used to process the sludges.

Again it should be understood that the dryers may be fired by conventional gas burners and that in some circumstances it may be desirable that the gases used for drying be sufficiently low in oxygen to prevent combustion within the dryers.

It should further be understood that although the process illustrated by FIG. 1 is a continuous process, the clarifier 20 and aeration tank 32 will normally consist of a number of such tanks which are used sequentially in order to allow settlement to take place in the tanks.

It is also recognized that there will be an increase in the ash content from the boiler due to non-combustible materials from the secondary sludge. However, it is believed that the volume of extra ash or solid content generated will be significantly less than the original dewatered sludge, resulting in a significant saving in landfill or other disposal costs.

It should be noted that paper may be made from a wide variety of plant fiber sources other than trees. For example bamboo, sugar cane wastes and hemp, and when non-wood fiber sources are used additional waste products which are useful for dewatering secondary sludge may be available.

It should be understood that the process herein described may be practiced with apparatus other than those illustrated in the Figure. For example, the mixing tank and high efficiency agitator could be replaced by a purely hydrodynamic mixer. The clarifier and aeration tanks could be replaced by filtration systems. The pumps and conveying systems could be replaced by gravity feed systems and the rotary drum dryers by other types of dryers.

It is understood that the invention is not limited to the particular construction and arrangement of parts herein illustrated and described, but embraces such modified forms thereof as come within the scope of the following claims.

We claim:

1. A method for treating wastewater from papermaking comprising the steps of:

separating primary sludge from secondary sludge contained in a wastewater stream by settlement in a clarifier to produce a precipitate containing the primary sludge and a supernate containing the secondary sludge;

mechanically dewatering the primary sludge by pressing the precipitate against a filter screen;

drying the primary sludge after it has been mechanically dewatered to produce a dried primary sludge;

mixing a flocculent with the supernate of the wastewater stream;

precipitating the secondary sludge from the supernate forming a second supernate;

decanting the supernate from the secondary sludge;

mixing an effective quantity of a dry water-absorptive particulate matter with the decanted secondary sludge to form a mixture, said dry water-absorptive particulate matter including at least one material selected from the group of dried primary sludge fines separated from said dried primary sludge, boiler fly ash and boiler fuel dryer fines, and mechanically dewatering the mixture by pressing the mixture against a filter screen wherein said mixture is dried in a boiler fuel drier and used as fuel for a boiler, said boiler fly ash being produced in said boiler, and said boiler fuel dryer fines are separated from said fuel.

2. The method of claim 1 wherein the method of mechanically dewatering the mixture employs a screw press.

3. The method of claim 1 wherein the effective quantity of dry absorptive particulate matter is comprised of substantially all of the dried primary sludge fines.

4. The method of claim 1 wherein the step of drying the mixture includes adding the mixture along with hog fuel to a rotary dryer and drying the mixture and the hog fuel together to form a boiler feed.

* * * * *